(12) United States Patent
Matsubara et al.

(10) Patent No.: US 11,914,910 B2
(45) Date of Patent: Feb. 27, 2024

(54) NON-TRANSITORY COMPUTER READABLE MEDIUM STORING PROGRAM, INFORMATION PROCESSING APPARATUS, AND INFORMATION PROCESSING METHOD FOR REPRODUCING IMAGE

(71) Applicant: FUJIFILM Business Innovation Corp., Tokyo (JP)

(72) Inventors: Koichi Matsubara, Kanagawa (JP); Yuichi Nishikuni, Kanagawa (JP); Shinya Takaishi, Kanagawa (JP); Daichi Kurotsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/880,639

(22) Filed: Aug. 3, 2022

(65) Prior Publication Data

US 2023/0305776 A1    Sep. 28, 2023

(30) Foreign Application Priority Data

Mar. 25, 2022  (JP) ................................ 2022-049944

(51) Int. Cl.
*G06F 3/12* (2006.01)
(52) U.S. Cl.
CPC .......... *G06F 3/1256* (2013.01); *G06F 3/1208* (2013.01)
(58) Field of Classification Search
USPC ................................................ 358/527, 358
See application file for complete search history.

(56) References Cited

U.S. PATENT DOCUMENTS

| | | | | |
|---|---|---|---|---|
| 2006/0192996 | A1* | 8/2006 | Yamamoto | G06F 3/1205 358/1.15 |
| 2010/0157341 | A1* | 6/2010 | Mori | H04N 1/6086 358/1.9 |
| 2011/0116137 | A1* | 5/2011 | Uratani | H04N 1/6058 358/3.23 |
| 2014/0063515 | A1* | 3/2014 | Sugita | G06K 15/027 358/1.9 |
| 2014/0355017 | A1* | 12/2014 | Sugita | H04N 1/6038 358/1.9 |
| 2019/0174074 | A1* | 6/2019 | Fukuoka | H04N 5/2621 |
| 2019/0354328 | A1* | 11/2019 | Tajima | G06F 3/1288 |
| 2020/0081673 | A1* | 3/2020 | Hayashi | H04N 1/6033 |
| 2020/0301624 | A1* | 9/2020 | Iwashita | G06F 3/1208 |
| 2022/0038604 | A1* | 2/2022 | Yamada | H04N 1/6058 |
| 2022/0373953 | A1* | 11/2022 | Dokiya | G01N 21/86 |

FOREIGN PATENT DOCUMENTS

| | | | | |
|---|---|---|---|---|
| JP | 2009164709 | A | * | 7/2009 |
| JP | 2017098740 | | | 6/2017 |
| JP | 2017098740 | A | * | 6/2017 |

* cited by examiner

*Primary Examiner* — Henok Shiferaw
(74) *Attorney, Agent, or Firm* — JCIPRNET

(57) ABSTRACT

A non-transitory computer readable medium storing a program causing a computer, which reproduces a color tone of a printed matter and displays the color tone on a screen before printing, to realize a function of acquiring a density value of a color material that develops a color by absorption of a specific wavelength component and a property of paper related to the absorption of the specific wavelength component, and a function of displaying an image that reproduces the color tone of the printed matter based on the density value and the property of the paper.

17 Claims, 14 Drawing Sheets

FIG. 3

| C | M | Y | K | FLUORESCENT COLOR | R | G | B | GLOSSINESS |
|---|---|---|---|---|---|---|---|---|
| 0 | 0 | 0 | 0 | 0 | XXX | XXX | XXX | XXX |
| 0 | 0 | 0 | 0 | 12.5 | XXX | XXX | XXX | XXX |
| 0 | 0 | 0 | 0 | 25 | XXX | XXX | XXX | XXX |
| ... | ... | ... | | | | ... | | |
| 100 | 100 | 100 | 100 | 87.5 | XXX | XXX | XXX | XXX |
| 100 | 100 | 100 | 100 | 100 | XXX | XXX | XXX | XXX |

DENSITY VALUE — VALUE USED TO CALCULATE DISPLAY COLOR

44A

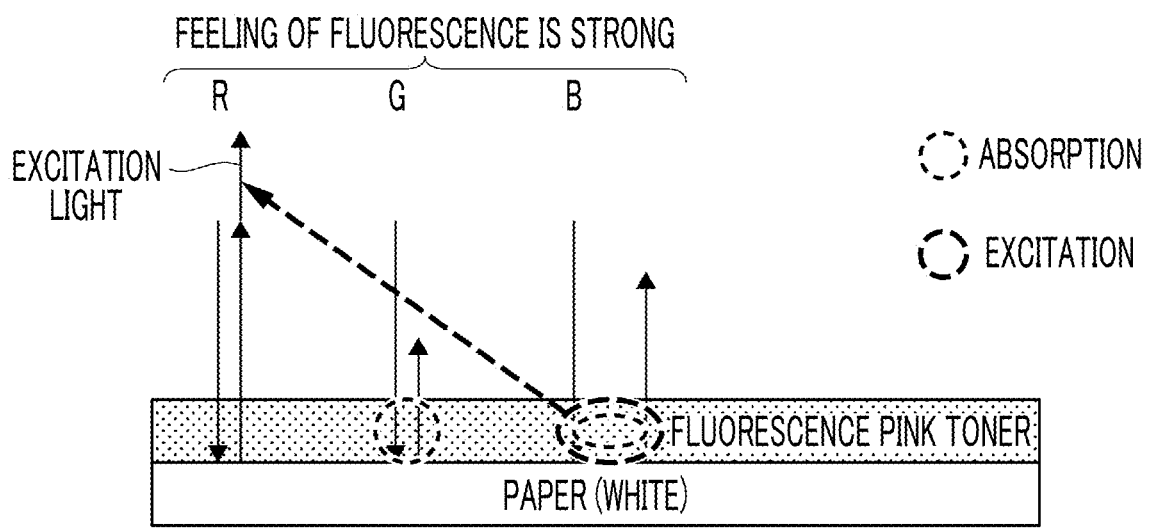
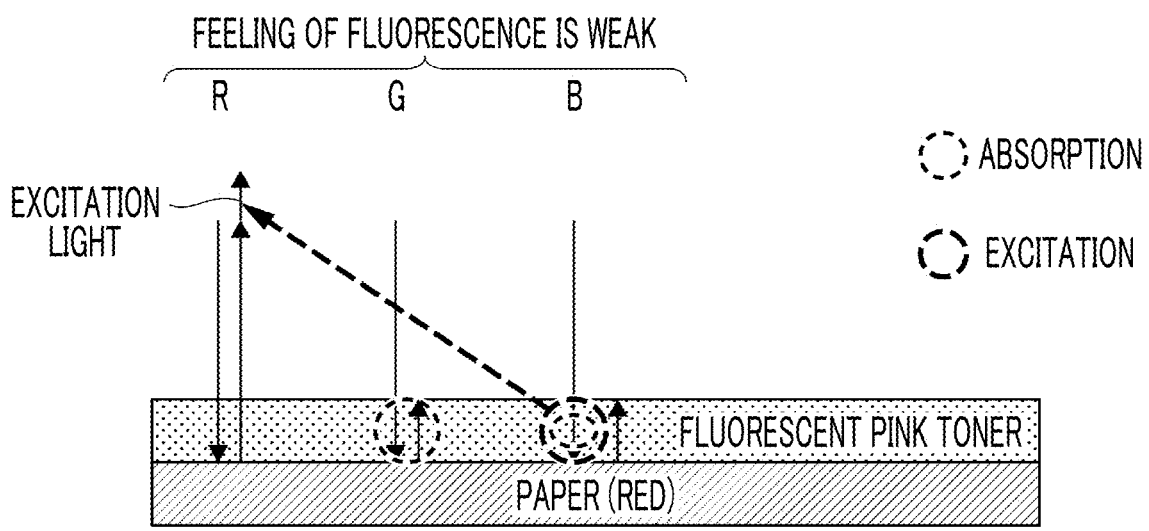

FIG. 8

CASE WHERE FLUORESCENT PINK IS PRINTED ON RED PAPER

- COLORED PAPER DLUT[GB] OF COMPONENT NOT CORRESPONDING TO EXCITATION WAVELENGTH = $\underbrace{\text{COLORED PAPER[GB]} \times \text{WHITE PAPER DLUT[GB] / WHITE PAPER[GB]}}_{\text{TRANSPARENCY OF GB}}$

- COLORED PAPER DLUT[R] OF COMPONENT CORRESPONDING TO EXCITATION WAVELENGTH = $\underbrace{\text{COLORED PAPER[R]} \times \text{WHITE PAPER DLUT[R] / WHITE PAPER[R]}}_{\text{TRANSPARENCY OF R}}$ $- \underbrace{(\text{WHITE PAPER DLUT[R]} - \text{WHITE PAPER DLUT[R(S=0)]})}_{\text{SIGNAL AMPLIFICATION (EXCITATION) ON COLORED PAPER}} \times \underbrace{(1 - (255 + \text{COLORED PAPER[B]}) / (255 + \text{WHITE PAPER[B]}))}_{\text{RATIO THAT IS NOT ORIGINALLY EXCITED ON COLORED PAPER}} \times \underbrace{\text{COLORED PAPER[R] / WHITE PAPER[R]}}_{\text{NORMALIZATION}}$

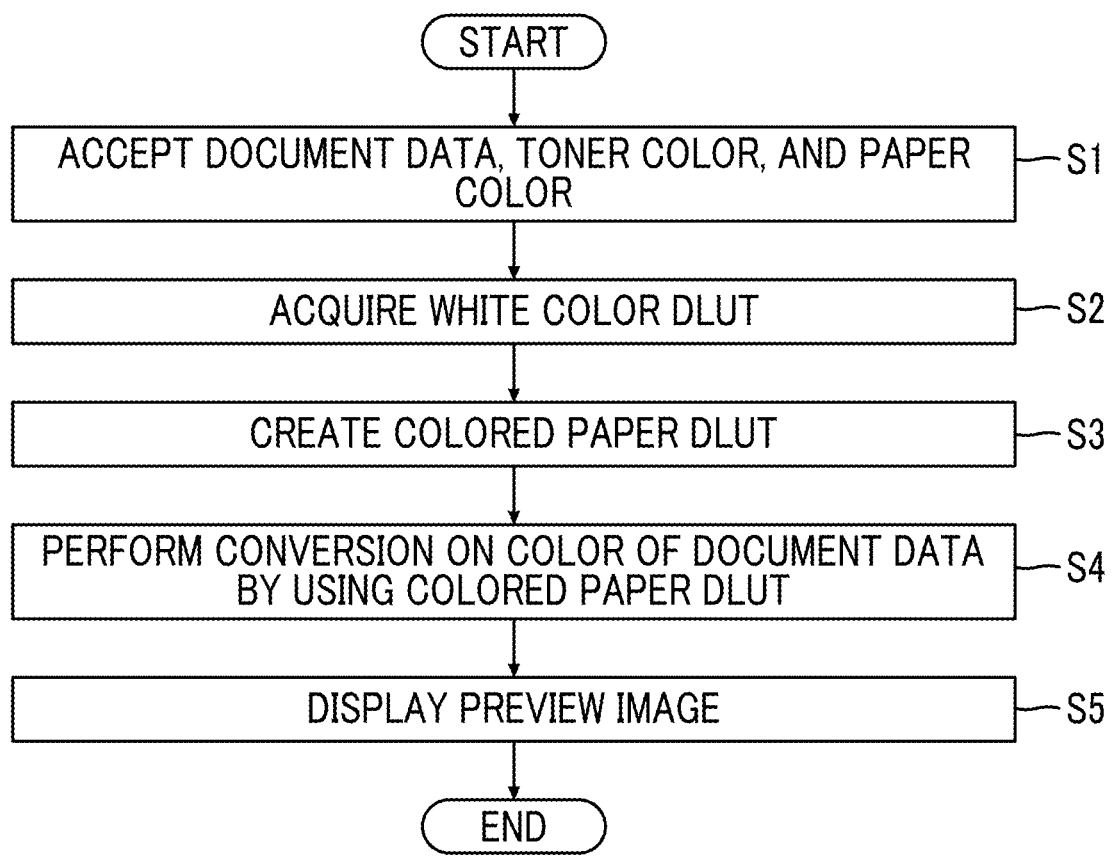

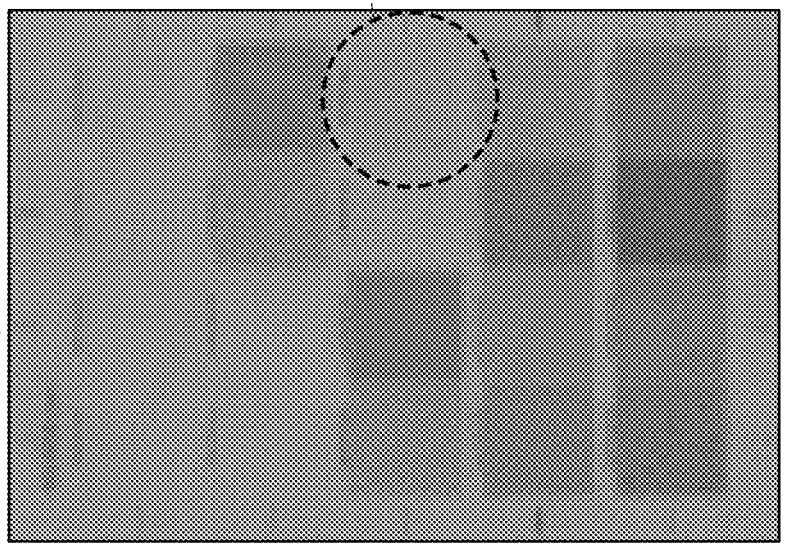
FIG. 10A PREVIEW IMAGE IN CASE OF PRINTING IS PERFORMED ON WHITE PAPER — YELLOW
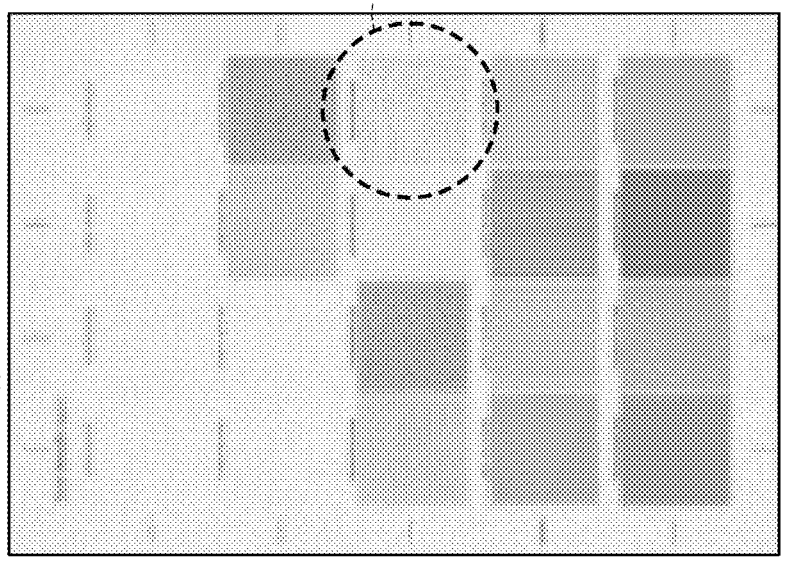
FIG. 10B PREVIEW IMAGE IN CASE OF PRINTING IS PERFORMED ON BLUE PAPER — GREEN PREVIEW IMAGE IN CASE OF PRINTING IS PERFORMED ON RED PAPER USING FLUORESCENT PINK PREVIEW IMAGE IN CASE OF PRINTING IS PERFORMED ON WHITE PAPER USING FLUORESCENT PINK

IN CASE WHERE PRINTING IS PERFORMED ON RED PAPER USING FLUORESCENT PINK

● COLORED PAPER DLUT[GB] OF COMPONENT NOT CORRESPONDING TO EXCITATION WAVELENGTH

= COLORED PAPER[GB] × WHITE PAPER DLUT[GB] / WHITE PAPER[GB]

● COLORED PAPER DLUT[R] OF COMPONENT CORRESPONDING TO EXCITATION WAVELENGTH

= (COLORED PAPER[R] × WHITE PAPER DLUT[R] / WHITE PAPER[R]) × $\alpha$

| BRAND NAME | CHARACTERISTIC OF PAPER |
|---|---|
| BRAND 1 | |
| BRAND 2 | |
| BRAND 3 | |
| BRAND 4 | |
| BRAND 5 | |
| ⋮ | |

FIG. 14

IN CASE WHERE PRINTING IS PERFORMED ON RED PAPER USING FLUORESCENT PINK

● COLORED PAPER DLUT[GB] OF COMPONENT NOT
CORRESPONDING TO EXCITATION WAVELENGTH = COLORED PAPER[GB] × WHITE PAPER DLUT[GB] / WHITE PAPER[GB]

● COLORED PAPER DLUT[R] OF COMPONENT
CORRESPONDING TO EXCITATION WAVELENGTH = (COLORED PAPER[R] × WHITE PAPER DLUT[R] / WHITE PAPER[R]) × COLORED PAPER [B] / WHITE PAPER[R]

NON-TRANSITORY COMPUTER READABLE MEDIUM STORING PROGRAM, INFORMATION PROCESSING APPARATUS, AND INFORMATION PROCESSING METHOD FOR REPRODUCING IMAGE

CROSS-REFERENCE TO RELATED APPLICATIONS

This application is based on and claims priority under 35 USC 119 from Japanese Patent Application No. 2022-049944 filed Mar. 25, 2022.

BACKGROUND

(i) Technical Field

The present invention relates to a non-transitory computer readable medium storing a program, an information processing apparatus, and an information processing method.

(ii) Related Art

Before printing, the color tone of an image to be printed may be confirmed on a screen. A preview function is used for the confirmation. By checking the color tone before printing, waste of paper and color materials is reduced.

In the field of color printing, four basic colors of Cyan (C), Magenta (M), Yellow (Y), and Black (K) are used. Nowadays, in addition to the basic colors, fluorescent colors may be used. In a case where the fluorescent colors are used, it is possible to reproduce vivid colors rather than a case of printing with only the basic colors.

SUMMARY

A toner corresponding to a fluorescent color (hereinafter, also referred to as a "fluorescent toner") is a color material that absorbs ultraviolet light and develops a color.

By the way, the absorption of ultraviolet light occurs not only in a case where ultraviolet light is incident from the front surface side of the fluorescent toner but also in a case where ultraviolet light is incident from the lower surface side of the fluorescent toner. The incident from the lower surface side is caused by the incident of ultraviolet light reflected on paper located on the lower layer of the fluorescent toner or another toner layer.

Therefore, in a case where a large amount of ultraviolet light is absorbed by paper used for printing, the amount of ultraviolet light incident from the lower surface side of the fluorescent toner is small compared to a case where printing is performed on paper whose absorption amount of ultraviolet light is small. As a result, the vividness of a color to be reproduced is deteriorated.

On the other hand, the property of paper that decreases the color development of the fluorescent toner is not taken into consideration in a preview function of the related art. For this reason, there is a difference between the appearance of an actual printed matter and the appearance of an image (hereinafter, also referred to as a "preview image") displayed on a screen.

Aspects of non-limiting embodiments of the present disclosure relate to a non-transitory computer readable medium storing a program, an information processing apparatus, and an information processing method that improve the reproducibility of the color tone of an image of a printed matter displayed on the screen as compared to a case where the property of paper that absorbs a specific wavelength component is not taken into consideration.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a non-transitory computer readable medium storing a program causing a computer, which reproduces a color tone of a printed matter and displays the color tone on a screen before printing, to realize a function of acquiring a density value of a color material that develops a color by absorption of a specific wavelength component and a property of paper related to the absorption of the specific wavelength component, and a function of displaying an image that reproduces the color tone of the printed matter based on the density value and the property of the paper.

BRIEF DESCRIPTION OF THE DRAWINGS

Exemplary embodiment(s) of the present invention will be described in detail based on the following figures, wherein:

FIG. 3 is a diagram showing an example of a data structure of a white color DLUT;

FIGS. 7A and 7B are diagrams showing a color development principle by a fluorescent toner, FIG. 7A shows the excitation amount of fluorescence in a case where a fluorescent pink toner is printed on white paper, and FIG. 7B shows the excitation amount of fluorescence in a case where the fluorescent pink toner is printed on red paper;

FIG. 8 is a diagram showing a calculation expression of the colored paper DLUT used for the display of a preview image in a case where printing is performed on non-white paper using the basic colors and a fluorescent color;

FIG. 9 is a flowchart showing an example of a processing operation related to the display of the preview image by the control device;

FIGS. 10A and 10B are diagrams showing examples of the display of the preview image in a case where the fluorescent color is not used, FIG. 10A shows an example of the preview image in a case where printing is performed with the basic colors on the white paper, and FIG. 10B shows an example of the preview image in a case where printing is performed with the basic colors on blue paper;

FIG. 11A shows an example of the preview image in a case where printing is performed on the white paper using the fluorescent pink toner, and FIG. 11B shows an example of the preview image in a case where printing is performed on the red paper using the fluorescent pink toner;

FIG. 12A shows an example of an operation screen, and FIG. 12B shows a calculation expression of a colored paper DLUT used in a second exemplary embodiment;

FIG. 13A shows an example of the operation screen, and FIG. 13B shows an example of a data table in which the brand of paper and the property of paper are linked; and FIG. 14 is a diagram showing a calculation expression of a colored paper DLUT used in a third exemplary embodiment.

DETAILED DESCRIPTION

Hereinafter, exemplary embodiments of the present invention will be described with reference to the accompanying drawings.

First Exemplary Embodiment

System Configuration

Figure 1:
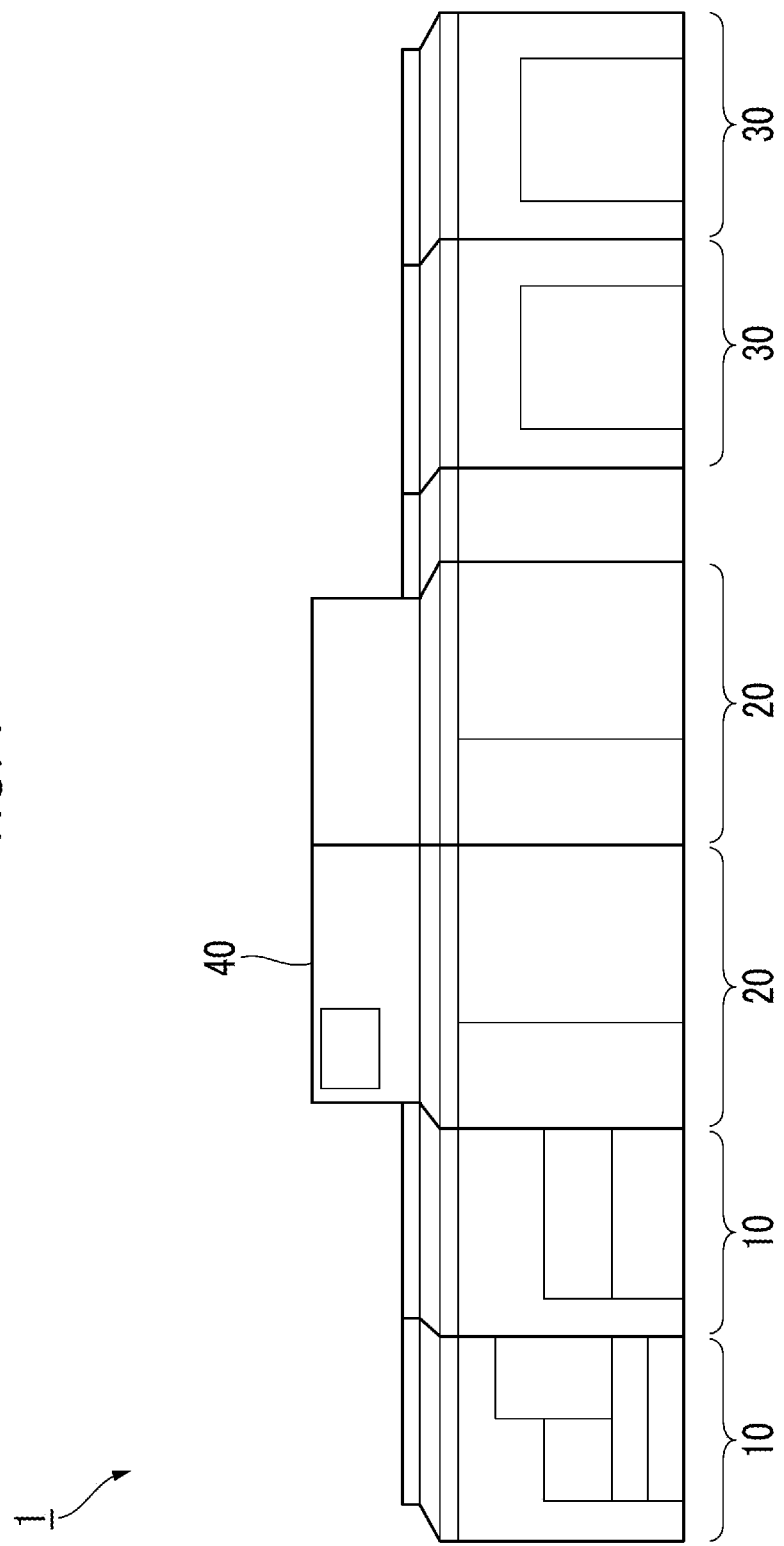
FIG. 1 is a diagram showing a configuration example of a printing system used in an exemplary embodiment.

FIG. 1 is a diagram showing a configuration example of a printing system 1 used in an exemplary embodiment.

The printing system 1 shown in FIG. 1 includes a paper feeding device 10, a printing device 20, a post-processing device 30, and a control device 40.

Here, the printing system 1 is an example of an image forming system, the printing device 20 is an example of an image forming apparatus, and the control device 40 is an example of an information processing apparatus.

The printing system 1 shown in FIG. 1 is also called a production printer. Though, the printing system 1 is not limited to the production printer, and may be a printer used in an office or a printer used at home. In addition to a print function, a scanner function, a fax transmission/reception function, and the like are provided in the printer used in the office. The difference between the printer used in the office and the printer used at home is mostly performance.

In the printing system 1 shown in FIG. 1, two paper feeding devices 10 are connected in series.

The paper feeding device 10 is a device that supplies paper to the printing device 20. In a case of the present exemplary embodiment, the paper feeding device 10 contains cut paper. The paper feeding device 10 contains, for example, 7,000 sheets of cut paper. Though, the paper contained in the paper feeding device 10 is not limited to the cut paper, and may be roll paper. In the case of the present exemplary embodiment, the paper is not limited to so-called white colored paper (hereinafter, also referred to as "white paper"), and it is assumed that colored paper (hereinafter, referred to as a "paper of a non-white color") is used.

The white paper here is an example of reference paper.

The non-white paper in the present exemplary embodiment is not limited to a case where the entire paper is a single color. For example, the paper may contain a plurality of colors.

Further, the non-white paper is not limited to dyed paper, and also includes paper whose surface is only colored. Therefore, paper which has a surface on which a color material is printed or a lower layer which is colored, may be included in the non-white paper in a broad sense. The paper here is an example of a recording medium.

In the printing system 1 shown in FIG. 1, two printing devices 20 are connected in series. The printing device 20 in the present exemplary embodiment has an engine (hereinafter, also referred to as a "printing engine") for printing an image on paper by an electrophotographic method.

The printing engine prints an image on paper through charging, exposing, developing, transferring, and fixing steps. The printing engine is an example of a forming unit that forms an image on paper using a plurality of color materials. The image is not limited to so-called a figure and a photograph, and may include text. In the following, a figure and a photograph formed on the surface of paper are also referred to as objects.

The printing device 20 used in the present exemplary embodiment is a device capable of printing using four types of toners corresponding to basic colors and one or two types of toners corresponding to a fluorescent color. In the following, a toner corresponding to the fluorescent color is referred to as a fluorescent toner.

The fluorescent toner includes pink, yellow, cyan, and other fluorescent colors. The fluorescent toner absorbs ultraviolet light and generates excitation light having a specific wavelength. The fluorescent color may be called a "spot color" because the fluorescent color is a color other than the basic colors.

The toner used in the printing device 20 is an example of the color material.

The printing device 20 in the present exemplary embodiment has a function of printing on both sides of the paper in addition to the function of printing on one side of the paper. The paper on which the image is printed is called a printed matter.

In the printing system 1 shown in FIG. 1, two post-processing devices 30 are connected in series. The post-processing device 30 is provided with, for example, a process of discharging the printed matter on the same page as a unit by shifting a position (that is, a stack process), a staple process of filing a plurality of sheets of paper with a staple, and a process of binding a plurality of sheets of paper with an adhesive tape.

The control device 40 is a device that controls the movement of the printing device 20 and the like. The control device 40 controls, for example, generation of a Direct Look Up Table (DLUT), scanning of the DLUT, management of a print job or document data used for printing, and a Raster Image Processer (RIP) process.

The DLUT is a table in which the density value of each toner color is associated with a value used for calculating each display color. The DLUT is an example of a conversion table.

The control device 40 also controls the generation of a preview image that reproduces the color tone of the printed matter before printing by using the above-described DLUT.

In the case of FIG. 1, the control device 40 is disposed at the upper part of the housing of the printing device 20, but may be disposed in the housing of the printing device 20.

The print job indicates a job instructing to print a document. One print job includes a data file (hereinafter, also referred to as "document data") corresponding to a document to be printed. The data format of the document data does not matter.

The document data includes an electronic document generated by an application program (hereinafter referred to as an "application") and an electronic document generated from a paper document.

The electronic document includes, for example, electronic data generated by so-called an office application, electronic data generated by a drawing application, electronic data generated by an accounting application, and a web page displayed in a website browsing application (that is, a browser).

The digitized document includes, for example, electronic data output from a scanner and electronic data output from a camera.

The document data in the present exemplary embodiment includes an object such as a figure and text, and a color is set for each object. The color of the object is given by, for example, each density value of Cyan (C), Magenta (M), Yellow (Y), Black (K), and a fluorescent color. In the present exemplary embodiment, fluorescent pink is assumed as the fluorescent color.

The density value in the present exemplary embodiment is represented by, for example, 0% to 100% or 0 to 255. 0% or 0 indicates the minimum density value, and 100% or 255 indicates the highest density value.

Configuration of Control Device

Figure 2:
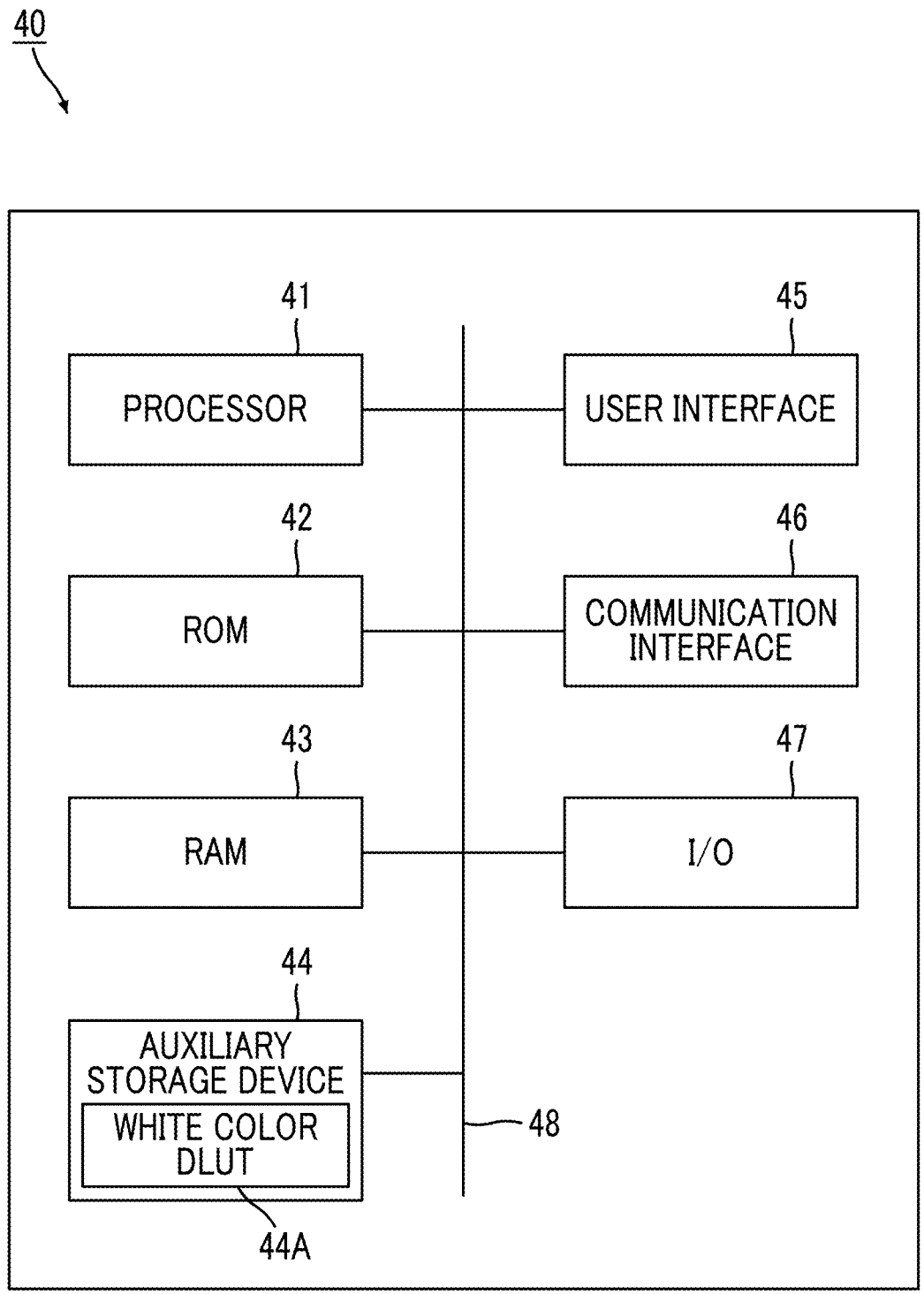
FIG. 2 is a diagram showing an example of a hardware configuration of a control device.

FIG. 2 is a diagram showing an example of the hardware configuration of the control device 40.

The control device 40 shown in FIG. 2 includes a processor 41, a Read Only Memory (ROM) 42 in which a Basic Input Output System (BIOS) and the like are stored, a Random Access Memory (RAM) 43 used as a work area of the processor 41, an auxiliary storage device 44, a user interface 45, a communication interface 46, and an I/O 47. Each unit of the control device 40 is connected through a bus or another signal line 48.

The processor 41 is a device that realizes various functions through the execution of a program.

The processor 41 in the present exemplary embodiment realizes the various functions through the execution of the program. The processor 41, the ROM 42, and the RAM 43 function as a computer.

The auxiliary storage device 44 is, for example, a hard disk device or a semiconductor storage. The auxiliary storage device 44 is used for storing the program, a print job, and the like. The program is used as a general term for an Operating System (OS) and an application program.

In addition, the auxiliary storage device 44 stores a DLUT (hereinafter referred to as a "white color DLUT") 44A in which the density value of each color given by the document data is converted into a display color observed in a case where printing is performed on paper of a white color.

FIG. 3 is a diagram showing an example of the data structure of the white color DLUT 44A.

The left column of the data structure corresponds to the density value defined in the document data, and the right column corresponds to the value used for calculating the display color.

In a case of FIG. 3, the density value is given by, for example, Cyan (C), Magenta (M), Yellow (Y), Black (K), and the fluorescent color.

On the other hand, the value used for calculating a display value is given by each gradation value of R (red), G (green), and B (blue) and glossiness. The gradation value may be called a "signal value". The gradation value is expressed by, for example, 0 to 255. 0 is the minimum value and 255 is the maximum value. The glossiness is expressed by, for example, 0% to 100%. 0% is the minimum value and 100% is the maximum value.

In FIG. 3, specific numerical values are omitted.

Returning to the description of FIG. 2.

The user interface 45 is an interface that accepts an operation of a user who uses the printing device 20. The user interface 45 has, for example, an input unit such as a button for operation and a touch sensor for detecting an operation by a user's fingertip, and a display unit such as a liquid crystal display or an organic Electro-Luminescent (EL) display.

The communication interface 46 is an interface for communicating with another terminal or the like. A wired or wireless communication method is used as the communication method of the communication interface 46. For example, ETHERNET (registered trademark), Wi-Fi (registered trademark), and the like are used as the communication standard of the communication interface 46.

The I/O 47 is a device used for communication between the processor 41, the printing device 20 (see FIG. 1), and the like.

Figure 4:
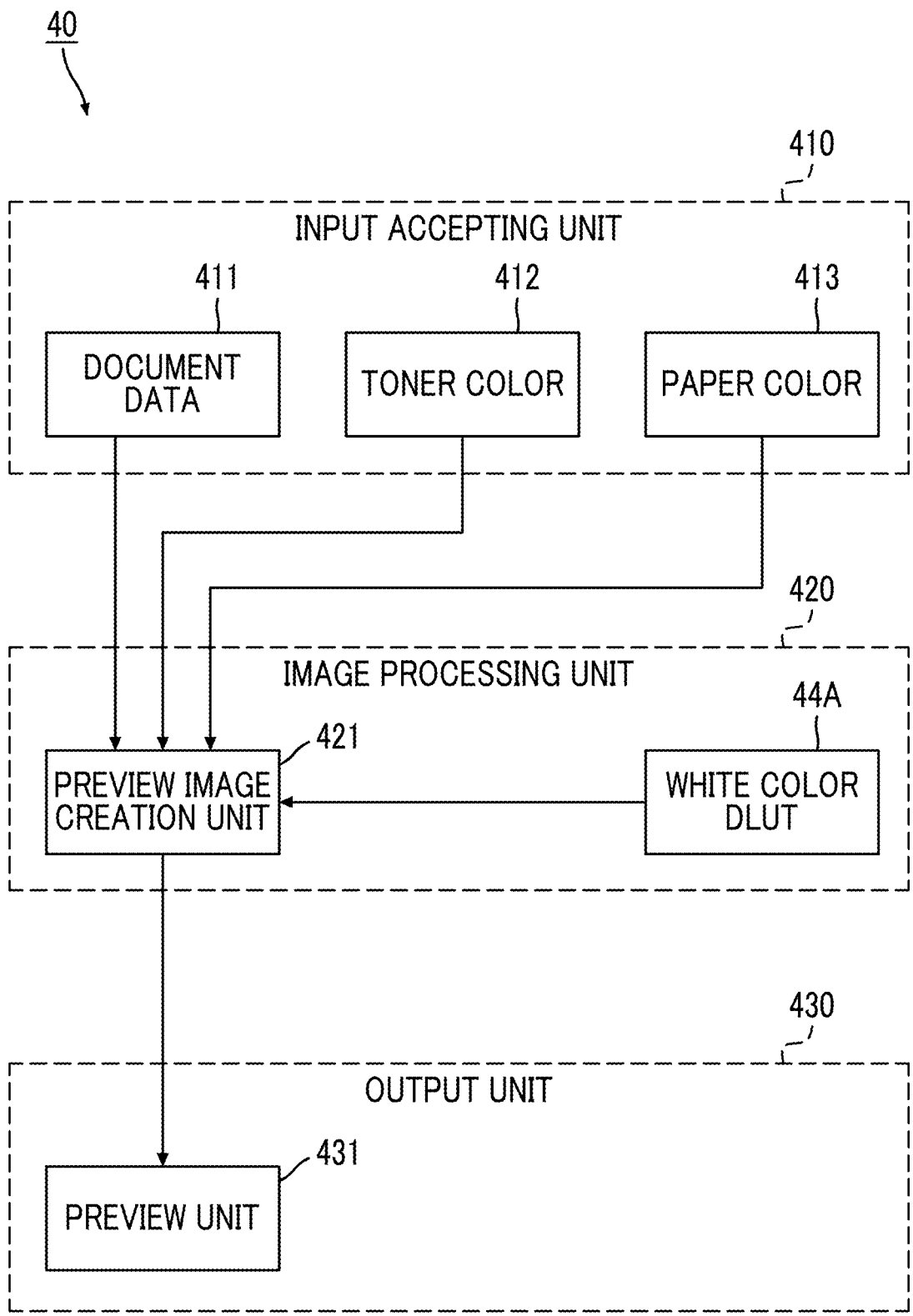
FIG. 4 is a diagram showing an example of a functional configuration of the control device.

FIG. 4 is a diagram showing an example of the functional configuration of the control device 40. The functional units shown in FIG. 4 are realized through the execution of the program by the processor 41 (see FIG. 2).

The functional units shown in FIG. 4 are schematically classified as an input accepting unit 410, an image processing unit 420, and an output unit 430.

The input accepting unit 410 is a functional unit that accepts information necessary for predicting the color tone of the printed matter.

In a case of FIG. 4, the input accepting unit 410 accepts the inputs of document data 411, a toner color 412, and a paper color 413. The document data 411 is, for example, a color chart in which a plurality of colors having different color tones are arranged in a matrix. The toner color 412 indicates a toner color that can be used as a color material by the printing device 20. The toner color 412 is given by, for example, Cyan (C), Magenta (M), Yellow (Y), Black (K), and the fluorescent color. In the case of the present exemplary embodiment, fluorescent pink is used as the fluorescent color. The paper color 413 is the color of the paper housed in the paper feeding device 10 (see FIG. 1), and is given by a density value of, for example, Cyan (C), Magenta (M), Yellow (Y), and Black (K).

The image processing unit 420 is a functional unit that generates a preview image that predicts the color tone of the printed matter.

In the case of FIG. 4, the image processing unit 420 includes a preview image creation unit 421 and a white color DLUT 44A.

The preview image creation unit 421 is a functional unit that executes creation of a color conversion table (hereinafter, referred to as a "colored paper DLUT") that reproduces a color tone observed in a case of printing an object on the surface of the non-white paper, and creation of the preview image.

The preview image creation unit 421 in the present exemplary embodiment creates the colored paper DLUT using the document data 411, the toner color 412, the paper color 413, and the white color DLUT 44A.

The created colored paper DLUT is stored in the auxiliary storage device 44 (see FIG. 2).

The preview image creation unit 421 creates a preview image in which the color of the object designated in the document data 411 is converted into a color that reproduces the appearance in a case where printing is performed on the non-white paper by referring to the white paper DLUT and the colored paper DLUT.

The output unit 430 is a functional unit that displays the preview image for predicting the color tone of the printed matter on the display unit.

In the case of FIG. 4, the output unit 430 is configured with a preview unit 431. The preview unit 431 displays the preview image created by the preview image creation unit 421 on the display unit. The preview image in the present exemplary embodiment is previewed in three dimensions.

Calculation Algorithm of Colored Paper DLUT

In the following, a calculation algorithm of the colored paper DLUT will be described with reference to FIGS. 5A to FIG. 8.

Figure 5:
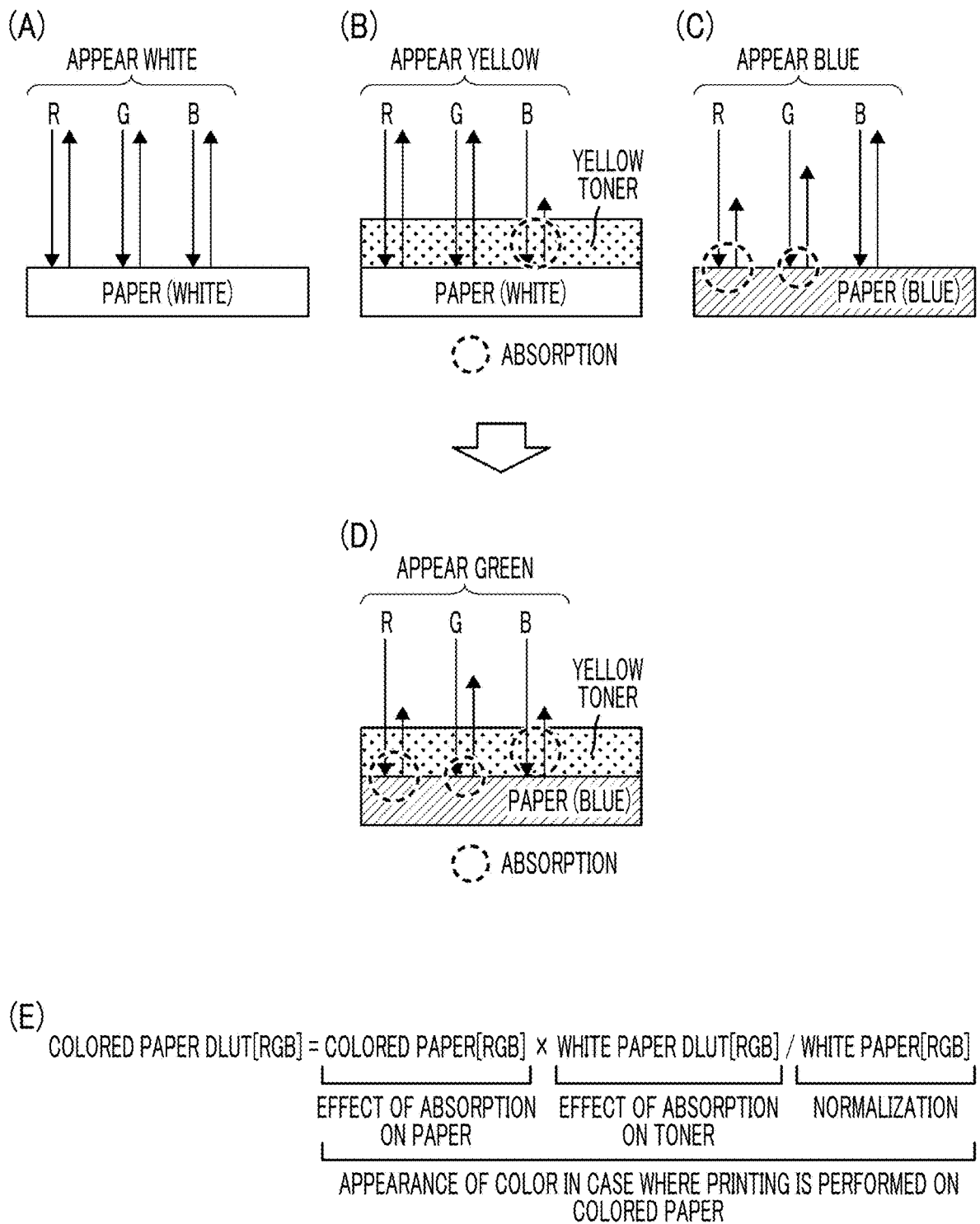
FIG. 5 is a diagram explaining a color recognition mechanism and a calculation algorithm of a colored paper DLUT, a part (A) of FIG. 5 is a diagram explaining the appearance of paper of a white color, a part (B) of FIG. 5 is a diagram explaining the appearance of the color tone of a part printed with a yellow toner on the surface of the paper of a white color, a part (C) of FIG. 5 is a diagram explaining the appearance of paper of a blue color, a part (D) of FIG. 5 is a diagram explaining the appearance of the color tone of a part printed with the yellow toner on the surface of the paper of a blue color, and a part (E) of FIG. 5 is a diagram explaining a calculation algorithm of the colored paper DLUT assuming a case where printing is performed using basic colors on the paper of a blue color.

FIG. 5 is a diagram explaining a color recognition mechanism and a calculation algorithm of a colored paper DLUT. A part (A) of FIG. 5 is a diagram explaining the appearance of paper of a white color, a part (B) of FIG. 5 is a diagram explaining the appearance of the color tone of a part printed with a yellow toner on the surface of the paper of a white color, a part (C) of FIG. 5 is a diagram explaining the appearance of paper of a blue color, a part (D) of FIG. 5 is a diagram explaining the appearance of the color tone of a part printed with the yellow toner on the surface of the paper of a blue color, and a part (E) of FIG. 5 is a diagram explaining a calculation algorithm of the colored paper DLUT assuming a case where printing is performed using basic colors on the paper of a blue color.

In each of FIGS. 5A to 5D, incidents and reflections of R (red), G (green), and B (blue) as natural light are represented by arrows.

A downward arrow indicates incident light, and an upward arrow indicates reflected light. The length of the arrow indicates the intensity of light.

In the part (A) of FIG. 5, the intensity of the light component incident on the paper of a white color and the intensity of the light component reflected by the paper of a white color are substantially the same. Therefore, R (red), G (green), and B (blue) are mixed and appears white.

By the way, the component of B (blue) has a property of being absorbed by the yellow toner. Therefore, in the part (B) of FIG. 5, only the intensity of the component of the reflected light of B (blue) is reduced. As a result, the component of R (red) and the component of G (green) are mixed and appear yellow.

In FIGS. 5A to 5E, the difference in the amount of absorbed components is represented by the size of a circle.

On the other hand, in the part (C) of FIG. 5, only for the component of B (blue), the light component, which is the same as in the incidents, is reflected by the paper of a blue color, and a part of the components of the R (red) and G (green) is absorbed by the paper of a blue color. As shown in the part (C) of FIG. 5, B (blue) is dominant in the reflected light from the paper of a blue color. As a result, the paper of a blue color will appear blue.

The component of R (red) has a larger amount of absorption on paper of a blue color than the component of G (green). Therefore, a circle representing the absorption of the component of R (red) in the part (C) of FIG. 5 is larger than a circle representing the absorption of the component of G (green), and the length of an arrow representing the intensity of the reflected light of the component of R (red) is shorter than that the component of G (green).

The part (D) of FIG. 5 shows a mechanism that appears greenish in a case where the yellow toner is printed on the paper of a blue color. As shown in the part (D) of FIG. 5, the absorption described in the part (C) of FIG. 5 occurs for the components of R (red) and G (green), and the absorption described in the part (B) of FIG. 5 occurs for the component of B (blue).

As a result, the component of the reflected light transmitted through the yellow toner and is output to the outside is dominated by the component of G (green). Therefore, the paper appears greenish.

The part (E) of FIG. 5 shows a calculation expression of the colored paper DLUT used for the display of the preview image in a case where printing is performed on the non-white paper using the basic colors.

colored paper DLUT [RGB]=colored paper [RGB]×
white paper DLUT [RGB]/white paper [RGB]

The colored paper [RGB] is a signal value that gives a display color of colored paper used for printing, that is, non-white paper, and is given as an RGB value. The white paper [RGB] is a signal value that gives a display color in a case where printing is performed on the white paper, and is given as an RGB value.

In a case where the white paper is used for printing, the same value appears in a numerator and a denominator, so the formula is only for white paper DLUT [RGB].

A denominator value is used to normalize the effect of absorption on the non-white paper as a relative value to the paper of a white color.

[RGB] in the part (E) of FIG. 5 corresponds to R (red), G (green), and B (blue) which are the display colors of the preview image.

Figure 6:
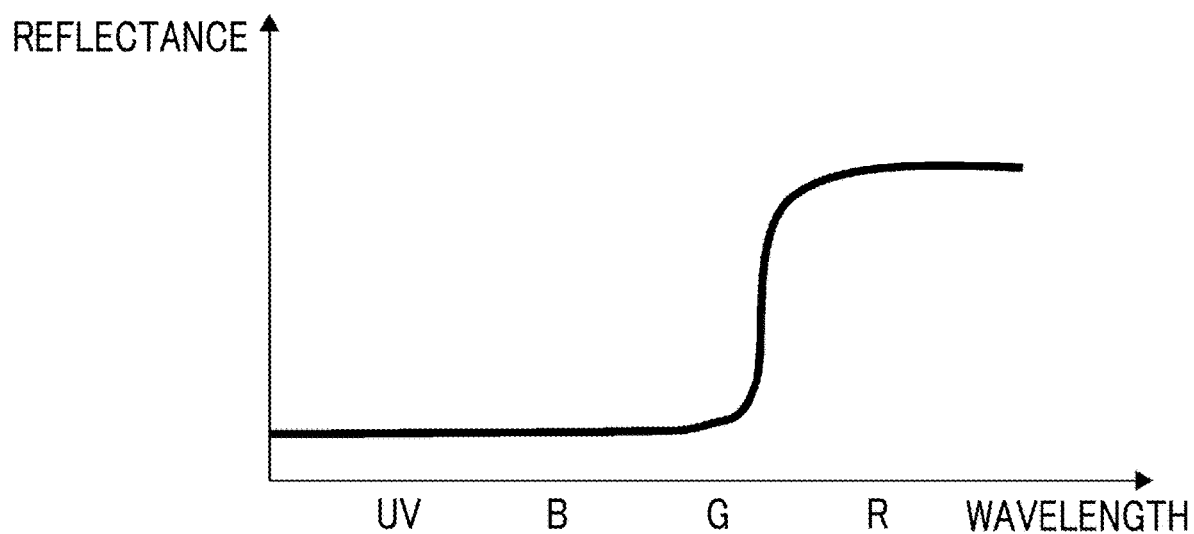
FIG. 6 is a diagram showing the reflectance for each wavelength of paper of a red color.

FIG. 6 is a diagram showing the reflectance for each wavelength of paper of a red color. A vertical axis is the reflectance and a horizontal axis is the wavelength of light. The reflectance is an example of the property that paper reflects light of a component having a specific wavelength. By the way, the law of conservation of energy holds for the reflection and absorption of the specific wavelength by the paper. Therefore, in other words, the reflectance is also an example of the property of absorbing light of the component having the specific wavelength.

In the case of FIG. 6, UV (ultraviolet wavelength), B (blue wavelength), G (green wavelength), and R (red wavelength) are arranged on the horizontal axis in the direction from a short wavelength to a long wavelength. That is, UV (ultraviolet wavelength) is a light component having the shortest wavelength, and B (blue wavelength) is a light component having the next shortest wavelength.

In FIG. 6, the reflectance for each wavelength of the paper of a red color (hereinafter, referred to as "red paper") is shown by a curve. The reflectance of UV (ultraviolet wavelength), B (blue wavelength), and G (green wavelength) is low, and the reflectance of R (red wavelength) is high. That is, the red paper shows that the reflected light of ultraviolet light is small.

According to the law of conservation of energy, a high reflectance indicates a low absorption rate. Further, a low reflectance indicates a high absorption rate.

FIGS. 7A and 7B are diagrams showing a color development principle by the fluorescent toner. FIG. 7A shows the excitation amount of fluorescence in a case where a fluorescent pink toner is printed on white paper, and FIG. 7B shows the excitation amount of fluorescence in a case where the fluorescent pink toner is printed on red paper.

Also in cases of FIGS. 7A and 7B, the incidents and reflections of R (red), G (green), and B (blue) as natural light are represented by arrows.

A downward arrow indicates incident light, and an upward arrow indicates reflected light. The length of the arrow represents the intensity of light.

FIG. 7A shows a light component transmitted through the fluorescent pink toner and incident on the white paper, and a light component transmitted through the fluorescent pink toner as the reflected light of the white paper and output to the outside.

In the case of FIG. 7A, the intensity of the incident light of R (red) and the intensity of the reflected light are substantially the same. The light component of G (green) has a large amount of absorption in the fluorescent pink toner. Therefore, the intensity of the reflected light of G (green) is approximately half the intensity of the incident light. The light component of B (blue) is also absorbed by the fluorescent pink toner, but the amount of absorption is smaller than the amount of absorption of the light component of G (green). Therefore, in FIG. 7A, the intensity of the reflected light of B (blue) is described higher than the intensity of the reflected light of the reflected light of G (green).

By the way, in FIG. 7A, the reflected light is described by regarding ultraviolet light as B (blue). That is, the intensities of the incident light and the reflected light of ultraviolet light are regarded as the same as the intensity of B (blue).

In this case, in the fluorescent pink toner, high-intensity excitation light is generated by absorption of both incident light and reflected light of ultraviolet light.

Since the color of the excitation light is pink, in FIG. 7A, an arrow indicating the excitation light is added to the tip of the arrow indicating the reflected light of R (red). That is, the component of R (red) output from the paper surface side is increased as compared with a case where the fluorescent pink toner is not used. As a result, the feeling of fluorescence appears strongly.

In the case of FIG. 7B, the intensity of the component of R (red) reflected by the red paper and output to the outside is equivalent to the intensity of the incident light. The intensity of the component of G (green) that is reflected by the red paper and output to the outside is smaller than intensity of the component of a case of being reflected by the white paper. The intensity of the component B (blue) that is reflected by the red paper and output to the outside is even smaller than the intensity of the component B (blue) in the case of being reflected by the white paper. In the example of FIG. 7B, the intensity of the reflected light of B (blue) is approximately one-third of the incident light.

Though, in FIG. 7B, only the component of the incident light is assumed as the component of ultraviolet light that contributes to the generation of the excitation light. Therefore, in FIG. 7B, the excitation light is generated by the absorption of the incident light of B (blue). The intensity of the excitation light is smaller than the intensity of the excitation light in a case of the white paper. Therefore, in FIG. 7B, the length of the arrow indicating the excitation light added to the tip of the arrow indicating the reflected light of R (red) is shortened. As a result, the feeling of fluorescence appears weak.

FIG. 8 is a diagram showing a calculation expression of a colored paper DLUT used for the display of the preview image in a case where printing is performed on the non-white paper using the basic colors and the fluorescent color.

Also in a case of FIG. 8, a case is assumed in which fluorescent pink is printed on the red paper. Therefore, in a case where the combinations of the fluorescent color and the color of the paper are different, it is necessary to replace the items of R, G, and B in the calculation expression shown in FIG. 8.

As described above, in a case where the fluorescent pink toner is printed on the red paper, the excitation light increases the intensity of R (red) and is irrelevant to the intensity of G (green) and B (blue).

Therefore, the colored paper DLUT that associates the density value of each color used for printing with the value used for calculating the display color is divided into a component not corresponding to the excitation wavelength and a component corresponding to the excitation wavelength.

Calculation Expression of Colored Paper DLUT of Component Not Corresponding to Excitation Wavelength In the case of the present exemplary embodiment, the components not corresponding to the excitation wavelengths are G (green) and B (blue). Therefore, in the case of the present exemplary embodiment, the colored paper DLUT of the component not corresponding to the excitation wavelength is the colored paper DLUT [GB]. The colored paper DLUT [GB] is given by the following equation.

colored paper DLUT [GB]=colored paper [GB]×
white paper DLUT [GB]/white paper [GB]

Here, the colored paper [GB] is a signal value of a color component that is not affected by the excitation light generated in a case where the fluorescent toner is printed on the non-white paper. That is, the colored paper [GB] is a signal value of G (green) and B (blue).

The white paper [GB] is a signal value of a display color in a case of printing the fluorescent toner on the white paper. That is, the colored paper [GB] is a signal value of G (green) and B (blue).

The white paper DLUT [GB] is a part of G (green) and B (blue) of the DLUT in which the density value of each color given by the document data is converted into the display color observed in a case where printing is performed on the paper of a white color.

Calculation Expression of Colored Paper DLUT of Component Corresponding to Excitation Wavelength In the case of the present exemplary embodiment, the component corresponding to the excitation wavelength is R (red). Therefore, in the following, the colored paper DLUT for R (red) will be described.

colored paper DLUT [R] of component corresponding to excitation wavelength=colored paper
[R]×white paper DLUT [R]/white paper [R]−A Here, the colored paper [R] is a signal value of a color component affected by the excitation light generated in a case where the fluorescent toner is printed on the non-white paper. That is, the colored paper [R] is a signal value of R (red).

The white paper [R] is a signal value of the display color in a case where the fluorescent toner is printed on the white paper. That is, the colored paper [R] is a signal value of R (red).

The white paper DLUT [R] is a part of R (red) of the DLUT in which the density value of each color given by the document data is converted into the display color observed in a case where printing is performed on the paper of a white color.

The above components are the same as the calculation expression of the component not corresponding to the excitation wavelength, except for the difference in color.

In the case of the present exemplary embodiment, the absorption of ultraviolet light by the non-white paper weakens the signal component of R (red). Therefore, the amount A that is not originally excited is subtracted.

The "amount A that is not originally excited" here is given by the following equation.

A=signal increment (excitation) on white paper×ratio that is not originally excited on colored paper× colored paper [R]/white paper [R]

Of these, the "signal increment (excitation) on the white paper" is given by the following equation.

signal increment (excitation) on white paper=white paper DLUT [R]−white paper DLUT [R(S=0)]

The white paper DLUT [R], which is the first term, is the part of R (red) of the white paper DLUT in a case where the fluorescent toner which is a spot color S is used for printing.

The white paper DLUT [R(S=0)], which is the second term, is the part of R (red) of the white paper DLUT in a case where the fluorescent toner, which is the spot color S, is not used for printing.

Therefore, the difference between the first term and the second term represents the signal value of the excitation light of the fluorescent toner.

Further, the "ratio that is not originally excited on colored paper" is given by the following equation.

ratio that is not originally excited on colored paper=1−(255+colored paper [B])/(255+white paper[B])

In the numerator of the second term, the colored paper [B] indicates the signal value of the colored paper of the display color B (blue) that contributes to the generation of the excitation light. This signal value corresponds to the reflected light of B (blue) in FIG. 7B. 255 corresponds to the maximum value of the amount of incident light.

That is, the numerator of the second term correspond to the sum of the arrow of the incident light and the arrow of the reflected light in FIG. 7B.

The denominator of the second term indicates the signal value of B (blue), which is a display color that contributes to the generation of excitation light, on a white paper. This signal value corresponds to the reflected light of B (blue) in FIG. 7A. 255 corresponds to the maximum value of the amount of incident light.

That is, the denominator of the second term corresponds to the sum of the arrow of the incident light and the arrows of the reflected light in FIG. 7A.

Therefore, the numerical value of the second term represents the ratio of the component of B (blue) that contributes to the generation of the excitation light in a case where printing is performed on the white paper. For example, the numerical value which is "0.7" is represented.

Therefore, by subtracting "0.7" from "1", the ratio of the decrease in the component of B (blue) due to the use of the red paper is calculated.

As a result, the amount A that is not originally excited is calculated.

Example of Processing Operation

FIG. 9 is a flowchart showing an example of a processing operation related to the display of the preview image by the control device 40. The symbol S shown in the drawing indicates a step.

The processing operation shown in FIG. 9 is controlled through the execution of the program by the processor 41 (see FIG. 2).

The processing operation shown in FIG. 9 is started in a case where the processor 41 accepts, for example, the display of the preview image that reproduces the color tone of the printed matter before printing.

First, the processor 41 accepts the document data, the toner color, and the paper color (step S1). The toner color is a toner color that can be actually used by the printing device 20 (see FIG. 1). As described above, the toner color has the basic colors and a spot color. In the present exemplary embodiment, the fluorescent color is assumed as the spot color. The color of the paper used for printing the document data is applied to the paper color.

Next, the processor 41 acquires a white color DLUT (step S2).

In a case of acquiring the white color DLUT, the processor 41 creates the colored paper DLUT (step S3). The colored paper DLUT can be calculated with reference to FIG. 8.

Next, the processor 41 converts the color of the document data using the colored paper DLUT (step S4). Specifically, the color of the document data is converted into each gradation value of red (R), green (G), and blue (B) and the glossiness.

Finally, the processor 41 displays the preview image created by using the paper color accepted in step S1 and the signal value calculated in step S4 (step S5).

In the present exemplary embodiment, the preview image is displayed on the display unit of the control device 40.

Example of Display of Preview Image

FIGS. 10A and 10B are diagrams showing examples of the display of the preview image in a case where the fluorescent color is not used. FIG. 10A shows an example of the preview image in a case where printing is performed with the basic colors on the white paper, and FIG. 10B shows an example of the preview image in a case where printing is performed with the basic colors on blue paper.

FIGS. 10A and 10B assume the case where the same color chart is printed on the paper.

In a case of FIG. 10A, since the paper has a white color, the color of a color patch is reproduced with almost the input value. Therefore, the color patch in a third row and a fourth column is displayed as a yellow color.

On the other hand, in a case where the paper is blue, as described in the part (D) of FIG. 5, the color patch in the third row and the fourth column is expressed as green in FIG. 10B.

Figure 11B:
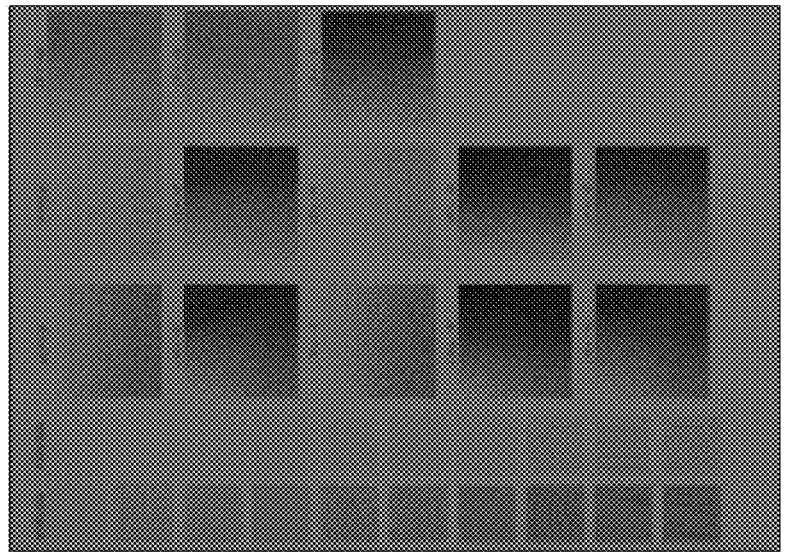
FIGS. 11A and 11B are diagrams showing examples of the display of the preview image in a case where the fluorescent color is used.
Figure 11A:
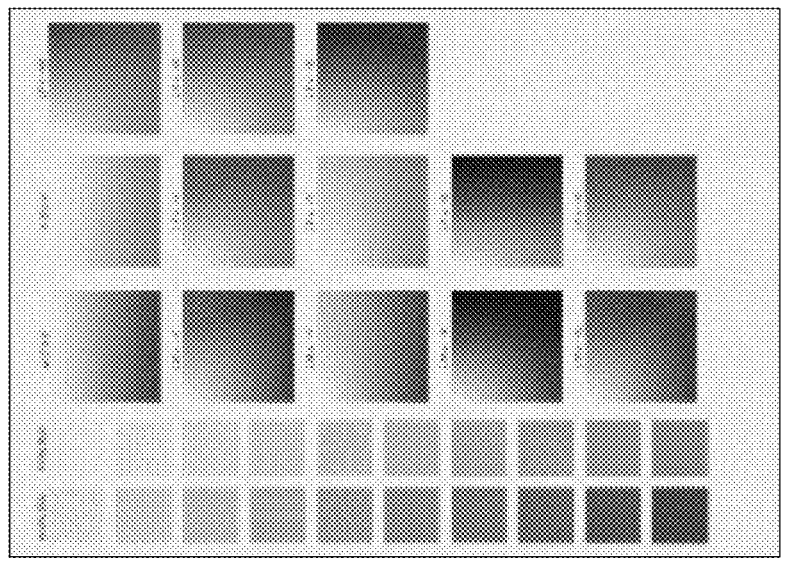

FIGS. 11A and 11B are diagrams showing examples of the display of the preview image in a case where the fluorescent color is used. FIG. 11A shows an example of the preview image in a case where printing is performed on the white paper using the fluorescent pink toner, and FIG. 11B shows an example of the preview image in a case where printing is performed on the red paper using the fluorescent pink toner.

FIGS. 11A and 11B assume a case where the same color chart is printed on the paper.

In the case of FIG. 11A, the paper has a white color, and the preview image having strong feeling of fluorescence is displayed in any color patch.

In the case of FIG. 11B, the paper is red, and ultraviolet light that can be used for excitation by the fluorescent pink toner is reduced rather than a case of the white paper. Therefore, the preview image having weak feeling of fluorescence is displayed.

Summary

As described above, in the present exemplary embodiment, in a case of printing the fluorescent toner on paper having a large amount of absorption of ultraviolet light, attention is paid to the property that the excitation light generated by the fluorescent toner is reduced and the feeling of fluorescence is weakened.

In the present exemplary embodiment, attention is paid to the component of B (blue) having a wavelength close to ultraviolet light, and a calculation expression is proposed for calculating the DLUT for each of the component corresponding to the excitation light by the fluorescent toner and the component not corresponding to the excitation light.

As a result, it is possible to generate a preview image in which the color tone is close to an actually observed color tone in a case where the image of the document data is printed on the non-white paper using the fluorescent color.

Second Exemplary Embodiment

In the present exemplary embodiment, another example of generation of the colored paper DLUT will be described.

The configuration of the printing system 1 (see FIG. 1) and the hardware configuration and functional configuration of the printing device 20 configuring the printing system 1 are the same as in the first exemplary embodiment.

Figures 12A, 12B:
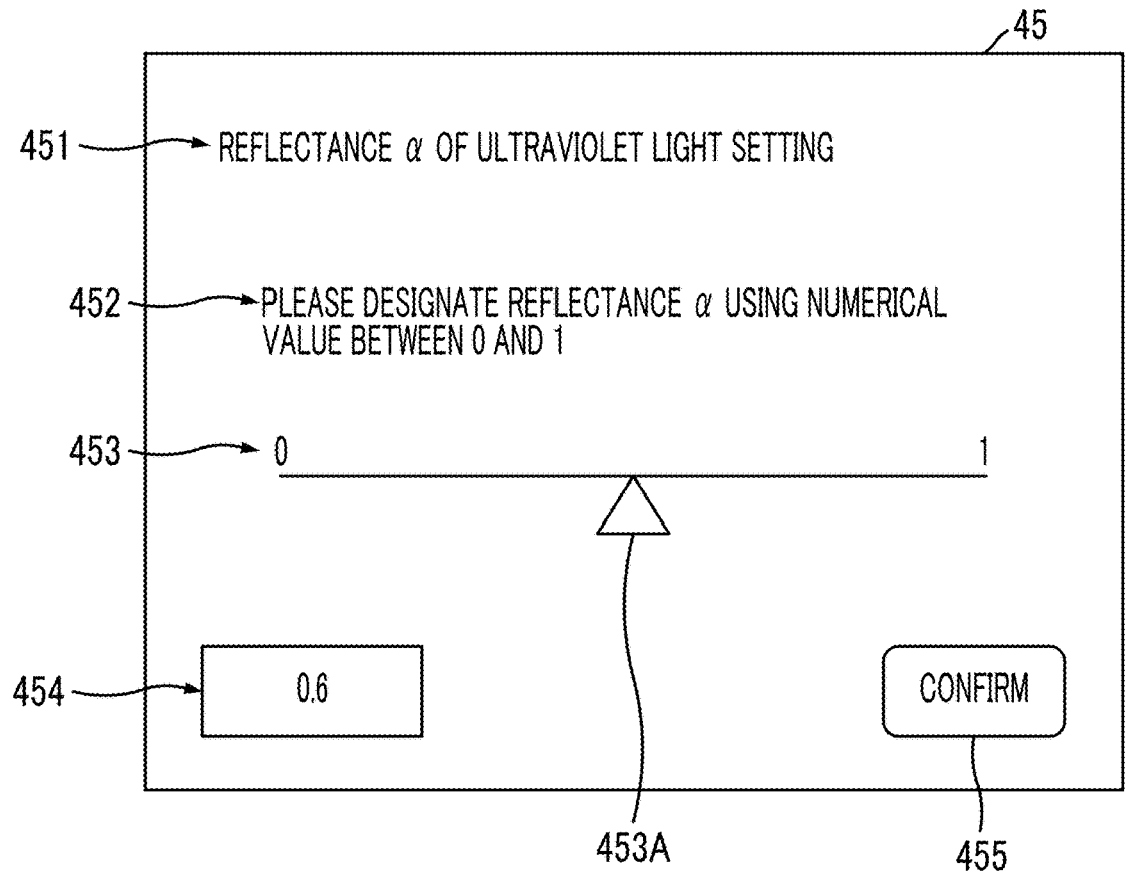
FIGS. 12A and 12B are diagrams showing examples in which a user designates the reflectance of ultraviolet light, which is the property of paper.

FIGS. 12A and 12B are diagrams showing examples in which a user designates the reflectance α of ultraviolet light, which is the property of the paper. FIG. 12A shows an example of an operation screen, and FIG. 12B shows a calculation expression of a colored paper DLUT used in a second exemplary embodiment.

FIG. 12A shows an example of an operation screen displayed on the display unit of the user interface 45. The operation screen shown in FIG. 12A is an example of a screen for input.

The operation screen shown in FIG. 12A is displayed with a title 451 "reflectance α of ultraviolet light setting".

In addition, "Please designate the reflectance α using a numerical value between 0 and 1" is displayed as a content 452 of an operation requested from the user. In the case of FIG. 12A, the reflectance of ultraviolet light on the white paper as the reference paper is set to "1". Here, "1" is the maximum value. That is, the reflectance α of the non-white paper is given as a relative value with respect to the reflectance of ultraviolet light in the white paper.

In the case of FIG. 12A, a slider bar 453 is used to designate the reflectance α. The numerical values from "0" to "1" are described in a rod-shaped area corresponding to the slider bar 453. The reflectance α can be designated by moving a slider 453A to the left or right by operating a mouse cursor or the like.

In a case of FIG. 12A, a numerical value column 454 is provided, and a numerical value corresponding to the position of the slider 453A is displayed. Here, a numerical value of "0.6" is displayed. In a case where a button 455 is operated, a designated numerical value is confirmed.

FIG. 12B is a diagram showing a calculation expression of a colored paper DLUT used for displaying the preview image in a case where printing is performed on the non-white paper using the basic colors and the fluorescent color.

Also in a case of FIG. 12B, a case is assumed in which fluorescent pink is printed on the red paper. Therefore, in a case where the combinations of the fluorescent color and the color of the paper are different, it is necessary to replace the items of R, G, and B in the calculation expression shown in FIG. 12B.

Calculation Expression of Colored Paper DLUT of Component Not Corresponding to Excitation Wavelength In a case of the present exemplary embodiment, the fluorescent pink toner is also used for printing. Therefore, the component not corresponding to the excitation wavelength includes G (green) and B (blue).

Therefore, the colored paper DLUT of the component that does not correspond to the excitation wavelength is the same as the [GB] part of the colored paper DLUT [RGB] described with reference to the part (E) of FIG. 5.

That is, a value used for calculating the display color of the preview image associated with the density value of the document data is given by the following equation.

colored paper DLUT [GB]=colored paper [GB]× white paper DLUT [GB]/white paper [GB]

For the white paper [GB] and the white paper DLUT [GB], only the signal values assuming a case where the amount of the excitation light is the maximum are used.

Calculation Expression of Colored Paper DLUT of Component Corresponding to Excitation Wavelength In the case of the present exemplary embodiment, the component corresponding to the excitation wavelength is R (red). Therefore, the colored paper DLUT of the component corresponding to the excitation wavelength is the colored paper DLUT [R].

As described above, ultraviolet light for which the fluorescent pink toner printed on the red paper can be used to generate the excitation light is less than ultraviolet light for which the fluorescent pink toner printed on the white paper can be used to generate the excitation light. The reason for this is that the amount of ultraviolet light incident on the fluorescent pink toner from the surface side of the red paper is smaller than a case of the white paper.

In order to calculate the deterioration in the total amount of ultraviolet light that can be used to generate the excitation light, the calculation as described in the first exemplary embodiment is required.

In the present exemplary embodiment, a method for simply calculating the colored paper DLUT of the component corresponding to the excitation wavelength is proposed.

Specifically, the total amount of ultraviolet light that can be used to generate the excitation light in a case where the fluorescent toner is printed on the white paper is used as the reference value, and the total amount of ultraviolet light that can be used to generate the excitation light which is deteriorated in a case where the fluorescent toner is printed on the non-white paper is given as a relative value for the reference value.

In the following, the reflectance α of non-white paper is used as an example of the relative value. The reflectance α of the non-white paper here is normalized to a relative value in which the reflectance α of the white paper is "1".

The deterioration in ultraviolet light due to the difference in reflectance α acts only on the deterioration in ultraviolet light incident on the fluorescent toner from the surface of the red paper, but, in the present exemplary embodiment, the deterioration in ultraviolet light due to the difference in reflectance α is used as an index in which the fluorescent toner reduces the total amount of ultraviolet light that can be used to generate the excitation light.

In this case, the colored paper DLUT [R] is given by the following equation.

colored paper DLUT [R]=(colored paper [R]×white paper DLUT [R]/white paper [R])×α

By using the colored paper DLUT created by the calculation expression, the signal value of R (red) of a portion where the fluorescent pink toner is printed on the red paper is corrected to a small value rather than the signal value of R (red) of a portion where the fluorescent pink toner is printed on the white paper.

The "signal value of R (red) of the portion where the fluorescent pink toner is printed on the red paper" is an example of a first pixel value, and the "signal value of R (red) of the portion where the fluorescent pink toner is printed on the white paper" is an example of a second pixel value.

The white paper is an example of reference paper with low absorption of ultraviolet light.

By the way, in the present exemplary embodiment, the "reflectance α" of the paper is used as the index for deteriorating the total amount of ultraviolet light that can be used to generate the excitation light, but another index representing a "property of reflecting ultraviolet light" may be used instead of the "reflectance α".

For example, a numerical value of 0 or more and 1 or less, which represents a ratio of the intensity of the reflected light obtained by adding the component of the excitation light of R (red) in FIG. 7A to the intensity of the reflected light obtained by adding the component of the excitation light of R (red) in FIG. 7B may be used instead of the "reflectance α".

In this case, the numerical value input in FIG. 12A is not the reflectance α but a numerical value representing the "property of the paper" or the "property of the reflection".

Further, instead of the reflectance α, an absorption rate β representing the property that the non-white paper absorbs ultraviolet light may be used. The absorption rate β can be calculated as β=1−α according to the law of conservation of energy.

The higher the reflectance α, the smaller the absorption rate β, and the smaller the reflectance α, the larger the absorption rate β. The absorption rate β of the white paper is set to "1".

In a case where the absorption rate β is used, the colored paper DLUT [R] is defined as the following equation.

colored paper DLUT [R]=(colored paper [R]×white paper DLUT [R]/(white paper [R])×(1β)

According to the calculation expression, the larger the absorption rate β, the smaller the signal value of the component corresponding to the excitation wavelength.

On the contrary, the smaller the absorption rate the larger the signal value of the component corresponding to the excitation wavelength, and the closer to the signal value of the white paper.

Although the case where the user inputs the numerical value through the operation screen has been described with reference to FIGS. 12A and 12B, the numerical value necessary for the calculation of the colored paper DLUT of the component corresponding to the excitation wavelength may be designated through the designation of the brand of paper or the like.

Figures 13A, 13B:
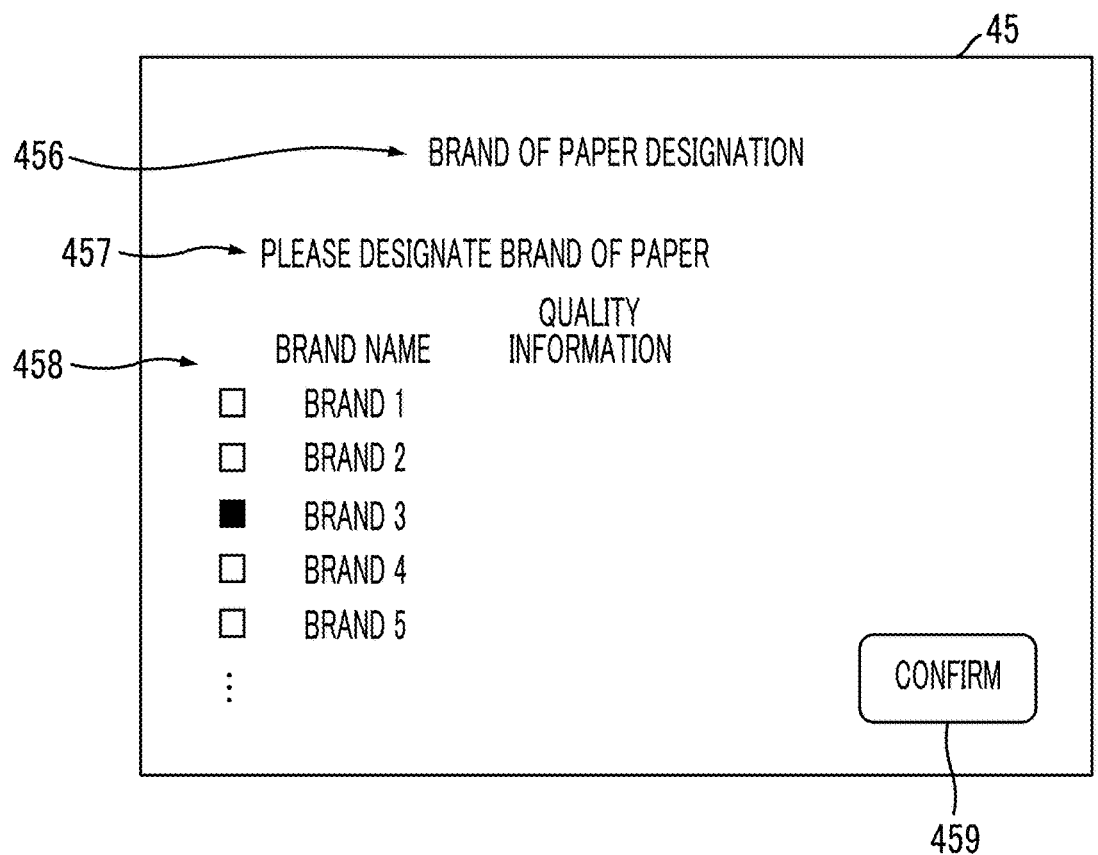
FIGS. 13A and 13B are diagrams showing examples of designating the property of paper required for calculation of the colored paper DLUT of a component corresponding to an excitation wavelength through designation of the brand of paper.

FIGS. 13A and 13B are diagrams showing examples of designating the property of the paper required for the calculation of the colored paper DLUT of the component corresponding to the excitation wavelength through the designation of the brand of paper. FIG. 13A shows an example of the operation screen, and FIG. 13B shows an example of a data table in which the brand of paper and the property of paper are linked.

FIG. 13A shows the example of the operation screen displayed on the display unit of the user interface 45. The operation screen shown in FIG. 13A is an example of an input screen.

On the operation screen shown in FIG. 13A, a title 456 "Designation of Brand of Paper" is displayed.

In addition, "Please designate the brand of paper" is displayed as content 457 of the operation requested from the user.

In FIG. 13A, a list 458 including a brand name and quality information is displayed in association with a check box. The user does not need to know the reflectance α, the absorption rate β, and other properties of the paper as numerical values, and may only check the check box. In a case where the button 459 is operated, a designation of the brand is confirmed.

In the data table shown in FIG. 13B, the property of the paper are associated with the brand name of the paper. The brand name registered in the data table is displayed on the operation screen shown in FIG. 13A.

The property of the paper includes, for example, the reflectance and other properties that reflect light of the specific wavelength component, the absorption rate and other properties that absorb light of the specific wavelength components, and an index representing a deterioration in the total amount of specific wavelength that can be used to generate the excitation light.

In any case, the user may only designate the brand of paper.

Third Exemplary Embodiment

In the present exemplary embodiment, another example of generation of the colored paper DLUT will be described.

The configuration of the printing system 1 (see FIG. 1) and the hardware configuration and functional configuration of the printing device 20 configuring the printing system 1 are the same as in the first exemplary embodiment.

In the present exemplary embodiment, the surface of the white paper on which the fluorescent toner is printed and the surface of the non-white paper are imaged in advance. From an image obtained by imaging the surface of the paper, the signal value of the component of the B (blue) close to the ultraviolet wavelength that contributes to the generation of the excitation light is acquired from the captured image.

The acquisition of the signal value of the component of B (blue) corresponds to the acquisition of the signal value of B (blue) in FIGS. 7A and 7B. The signal value here is an example of the component value of B (blue).

In the present exemplary embodiment, the ratio of the signal value of B (blue) acquired from the image corresponding to FIG. 7A to the signal value of B (blue) acquired from the image corresponding to FIG. 7B is estimated to be the property of ultraviolet light reflected from the paper and output to the outside.

FIG. 14 is a diagram showing a calculation expression of the colored paper DLUT used in the third exemplary embodiment.

The colored paper DLUT shown in FIG. 14 is also generated separately for a component not corresponding to the excitation wavelength and a component corresponding to the excitation wavelength.

Calculation Expression of Colored Paper DLUT of Component Not Corresponding to Excitation Wavelength In a case of the present exemplary embodiment, the fluorescent pink toner is also used for printing. Therefore, the component not corresponding to the excitation wavelength includes G (green) and B (blue).

Therefore, the colored paper DLUT of the component not corresponding to the excitation wavelength is the same as the colored paper DLUT [GB] described with reference to the part (E) of FIG. 5.

That is, a value used for calculating the display color of the preview image associated with the density value of the document data is given by the following equation.

colored paper DLUT [GB]=colored paper [GB]× white paper DLUT [GB]/white paper [GB]

Calculation Expression of Colored Paper DLUT of Component Corresponding to Excitation Wavelength In the case of the present exemplary embodiment, the component corresponding to the excitation wavelength is R (red). Therefore, the colored paper DLUT of the component corresponding to the excitation wavelength is the colored paper DLUT[R].

As described above, in the present exemplary embodiment, the effect of absorption of ultraviolet light by the paper is estimated by using the signal value of the image of the component of B (blue) close to the wavelength of ultraviolet light.

In this case, the colored paper DLUT [R] is given by the following equation.

colored paper DLUT [R]=(colored paper[R]×white paper DLUT [R]/white paper [R])×colored paper [B]/white paper [R]

In the equation, colored paper [B]/white paper [R] is used instead of the reflectance a in the second exemplary embodiment. As described above, the colored paper [B]/white paper [R] represents the property of the reflection of ultraviolet light by the paper used for printing.

In the present exemplary embodiment, it is necessary to capture an image of the white paper printed with the fluorescent toner and an image of the non-white paper printed with the fluorescent toner. However, even in a case where paper whose properties, such as the reflectance α and the absorption rate β, are unknown is used for printing, it is possible to reproduce the appearance, which is acquired in a case where arbitrary document data is printed on the non-white paper, with high accuracy.

Other Exemplary Embodiments (1) Although the exemplary embodiments of the present invention have been described above, the technical scope of the present invention is not limited to the scope described in the above-described exemplary embodiments. It is clear from the description of the claims that the above-described exemplary embodiments with various modifications or improvements are also included in the technical scope of the present invention.

(2) In the above-described exemplary embodiments, the control device 40 (see FIG. 1) is disposed on the upper part of the housing of the printing device 20 (see FIG. 1), but may be realized as an independent information processing apparatus, for example, a server, connected through a network or a signal line.

(3) In the above-described exemplary embodiment, a toner is exemplified as an example of a color material of a fluorescent color, but the color material may be ink.

(4) In the above-described exemplary embodiment, the fluorescent toner is exemplified as an example of the color material that develops a color by absorption of a specific wavelength component, but the specific wavelength component is not limited to the ultraviolet wavelength UV.

(5) In the above-described exemplary embodiment, the paper having the property of absorbing the component of the ultraviolet wavelength is described as the non-white paper, but the above-described technique can be applied to a white color having the property of absorbing the component of the ultraviolet wavelength.

(6) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer, which reproduces a color tone of a printed matter and displays the color tone on a screen before printing, to realize:

a function of acquiring a density value of a color material that develops a color by absorption of a specific wavelength component and a property of paper related to the absorption of the specific wavelength component; and a function of displaying a preview image that reproduces the color tone of the printed matter based on the density value and the property of the paper, wherein the function of acquiring includes acquiring the property of the paper through designation of a brand of the paper.

2. The non-transitory computer readable medium storing a program according to claim 1,
wherein the specific wavelength component is a light component having a short wavelength.

3. The non-transitory computer readable medium storing a program according to claim 2,
wherein the specific wavelength component is ultraviolet light.

4. The non-transitory computer readable medium storing a program according to claim 1,
wherein the property of the paper is a property of reflecting light of the specific wavelength component, which is incident on a surface of the paper.

5. The non-transitory computer readable medium storing a program according to claim 1,
wherein the function of acquiring includes scanning the property of the paper from a table in which the property of the paper related to the absorption of the specific wavelength component is associated with the brand of the paper.

6. The non-transitory computer readable medium storing a program according to claim 1,
wherein the function of acquiring includes acquiring a value designated by a user through an input screen as the property of the paper.

7. The non-transitory computer readable medium storing a program according to claim 1,
wherein the function of acquiring includes acquiring a component value of a blue color of an image obtained by capturing the paper used for printing as the property of the paper.

8. The non-transitory computer readable medium storing a program according to claim 1,
wherein the function of displaying the preview image includes correcting a first pixel value representing a color of the color material to a value smaller than a second pixel value in a case where the color material is printed on reference paper with low absorption of the specific wavelength component.

9. The non-transitory computer readable medium storing a program according to claim 8,
wherein the function of displaying the preview image includes correcting the second pixel value to the first pixel value according to a property of reflecting light of the specific wavelength component, which is incident on a surface of the paper.

10. The non-transitory computer readable medium storing a program according to claim 8,
wherein the function of displaying the preview image includes correcting the second pixel value to the first pixel value according to the property of the paper associated with the brand of the paper.

11. The non-transitory computer readable medium storing a program according to claim 8,
wherein the function of displaying the preview image includes correcting the second pixel value to the first pixel value according to the property of the paper designated by a user through an input screen.

12. The non-transitory computer readable medium storing a program according to claim 8,
wherein the function of displaying the preview image includes correcting the second pixel value to the first pixel value by using a component value of a blue color of an image obtained by capturing the paper used for printing.

13. The non-transitory computer readable medium storing a program according to claim 1,
wherein the brand of the paper includes quality information of the paper and color information of the paper.

14. An information processing apparatus comprising:
a processor configured to:
acquire a density value of a color material that excites a color by absorption of a specific wavelength component and a property of paper related to the absorption of the specific wavelength component; and
display a preview image that reproduces a color tone of a printed matter based on the density value and the property of the paper
wherein the property of the paper is acquired through designation of a brand of the paper.

15. The information processing apparatus according to claim 14,
wherein the brand of the paper includes quality information of the paper and color information of the paper.

16. An information processing method comprising:
acquiring a density value of a color material that develops a color by absorption of a specific wavelength component and a property of paper related to the absorption of the specific wavelength component; and
displaying a preview image that reproduces a color tone of a printed matter based on the density value and the property of the paper,
wherein the property of the paper is acquired through designation of a brand of the paper.

17. The information processing method according to claim 16,
wherein the brand of the paper includes quality information of the paper and color information of the paper.

* * * * *